United States Patent
Lee et al.

(10) Patent No.: US 8,565,752 B2
(45) Date of Patent: Oct. 22, 2013

(54) FEMTOCELL BASE STATION AND MANAGEMENT SYSTEM THEREOF

(75) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/447,340

(22) Filed: Apr. 16, 2012

(65) Prior Publication Data

US 2012/0264418 A1 Oct. 18, 2012

(30) Foreign Application Priority Data

Apr. 14, 2011 (KR) ................. 10-2011-0034852

(51) Int. Cl.
*H04W 4/00* (2009.01)

(52) U.S. Cl.
USPC ......... 455/422.1; 455/424; 455/425; 455/461

(58) Field of Classification Search
USPC .............................. 455/524, 525, 561, 422.1
See application file for complete search history.

(56) References Cited

U.S. PATENT DOCUMENTS

| | | | |
|---|---|---|---|
| 7,796,514 | B2 | 9/2010 | Noriega |
| 2006/0178153 | A1 | 8/2006 | Tenny et al. |
| 2009/0238143 | A1 | 9/2009 | Mukherjee et al. |
| 2010/0008324 | A1 | 1/2010 | Lee et al. |
| 2010/0015978 | A1 | 1/2010 | Yoon et al. |
| 2010/0075679 | A1 | 3/2010 | Tenny et al. |
| 2010/0169412 | A1 | 7/2010 | Gupta |
| 2010/0260168 | A1 | 10/2010 | Gheorghiu et al. |
| 2011/0013560 | A1 | 1/2011 | Zhang et al. |
| 2011/0092214 | A1 | 4/2011 | Iwamura |

FOREIGN PATENT DOCUMENTS

| | | |
|---|---|---|
| CN | 102014449 A | 4/2011 |
| KR | 10-2005-0068400 A | 7/2005 |
| KR | 10-2005-0121136 A | 12/2005 |
| KR | 10-2007-0110348 A | 11/2007 |
| KR | 10-2008-0026855 A | 3/2008 |
| KR | 10-2008-0080801 A | 9/2008 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0060353 A | 6/2010 |
| KR | 10-2010-0066524 A | 6/2010 |
| KR | 10-2010-0092742 A | 8/2010 |
| KR | 10-2010-0126776 A | 12/2010 |
| KR | 10-2010-0126818 A | 12/2010 |
| KR | 10-2010-0133821 A | 12/2010 |
| KR | 10-2011-0099327 A | 9/2011 |

OTHER PUBLICATIONS

3GPP TS 32.593 V10.0.0, "3rd Generation Partnership Project, Technical Specification Group Services and System Aspects; Telecommunication management; Home enhanced Node B (HeNB) Operations, Administration, Maintenance and Provisioning (OAM&P); Procedure flows for Type 1 interface HeNB to HeNB Management System (HeMS) (Release 10)", Jun. 2010, pp. 1-20, 3GPP, France.

*Primary Examiner* — Charles Appiah
*Assistant Examiner* — Edward Zhang
(74) *Attorney, Agent, or Firm* — IP Legal Services, LLC

(57) ABSTRACT

Provided are femtocell base stations and a management system therefor establishing an X2 interface between femtocell base stations. The method may include obtaining, by the femtocell base station, an Internet Protocol (IP) address of one or more neighbor femtocell base stations, and establishing the X2 interface between the femtocell base station and the neighbor femtocell base station using the corresponding, obtained IP address.

19 Claims, 4 Drawing Sheets

FEMTOCELL BASE STATION AND MANAGEMENT SYSTEM THEREOF

CROSS REFERENCE TO PRIOR APPLICATIONS

The present application claims priority under 35 U.S.C. §119 to Korean Patent Application No. 10-2011-0034852 (filed on Apr. 14, 2011), which is hereby incorporated by reference in its entirety.

FIELD OF THE INVENTION

The present invention relates to managing femtocell base stations and, in particular, to setting up an X2 interface between femtocell base stations.

BACKGROUND OF THE INVENTION

A femtocell base station is designed to connect user equipment located in a femtocell to a service provider's network. A femtocell may denote a small service area covered by a femtocell base station. For example, the femtocell may be a home or a small business office in a cellular system. The range of a femtocell base station may be about 10 meters. The femtocell base station has been applied to a Long Term Evolution (LTE) communication network. The $3^{rd}$ Generation Partnership Project (3GPP) has introduced standard-specifications for LTE technology. In 3GPP LTE standard specifications, the femtocell base station has been defined as well as a macrocell base station. The femtocell base station may be referred to as a Home NodeB (HNB) for a 3G femtocell or as a Home Evolved Node Base station (HeNB) for an LTE femtocell. The macrocell base station may be referred to as an evolved NodeB (eNB).

3GPP LTE standard specifications also define an X2 interface. The X2 interface may be a logical interface between two macrocell base stations, such as eNBs. For example, the X2 interface may be a point to point link between eNBs, but a physical relation thereof need not be a point to point link. The X2 interface may allow eNBs to be interconnected with each other. The macrocell base stations may exchange signaling information including control data through the X2 interface. That is, the macrocell base stations may perform handover and load balancing by exchanging information through the X2 interface. Particularly, the X2 interface may enable functions of mobility management, load management, inter-cell interference coordination, general X2 management and error handling, application level data exchange between eNBs, and Trace function.

As described above, the X2 interface may provide various functions and macrocell base stations may be efficiently managed through many management tasks of the X2 interface. Femtocell base stations may perform various tasks similar to those of macrocell base stations. Femtocell base stations may need the functions of the X2 interface in order to exchange signal information, for handover, and/or for load balancing. However, the 3GPP LTE standard specification does not define an X2 interface for femtocell base stations such as, for example, HeNBs or HNBs.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an X2 interface may be established between femtocell base stations.

In accordance with an exemplary embodiment of the present invention, a method may be provided for establishing an X2 interface between a femtocell base station and a neighbor femtocell base station. The method may include: obtaining, by the femtocell base station, an Internet Protocol (IP) address of one or more neighbor femtocell base stations, and establishing the X2 interface between the femtocell base station and the neighbor femtocell base station using the corresponding, obtained IP address.

The obtaining IP address may include detecting the one or more neighbor base stations, selecting the neighbor femtocell base station from the one or more neighbor base stations, requesting the IP address of the selected neighbor femtocell base station to a management system, and receiving the IP address of the selected neighbor femtocell base station from the management system.

The detecting the neighbor femtocell base station may include receiving signals broadcast from the one or more neighbor base stations, extracting cell information from the received signals, and identifying the one or more neighbor femtocell base stations from the one or more neighbor base stations based on the extracted cell information.

For the extracting, the cell information may include physical cell identifiers and/or cell global identifiers of the neighbor base stations. The physical cell identifier and/or cell global identifiers may be associated with the identifying each of the one or more neighbor femtocell base stations from each of the one or more neighbor base stations.

The broadcast signals may be pilot signals.

The method may include scanning and receiving the broadcast signals in a listening mode of the femtocell base station.

For the requesting the IP address, a physical cell identifier and/or a cell global identifier corresponding to the neighbor femtocell base station may be included in an information request message, and the information request message may be transmitted to the management system.

In the receiving the IP address, an information response message may be received from the management system having the IP address of the corresponding femtocell base station.

Prior to transmission of the information request message, the neighbor femtocell base station may be registered at the management system, a session may be established between the femtocell base station to the management system, and the information request message and the information response message may be transferred through the session.

After exchanging the information request message and the information response message, the session may be terminated.

The establishing the X2 interface may include transmitting an X2 setup request message to the neighbor femtocell base station using the corresponding IP address, and receiving an X2 setup response message from the neighbor femtocell base station.

For the establishing the X2 interface, the X2 interface may enable the femtocell base station and the neighbor femtocell base station to perform functions of mobility management, load management, inter-cell interference coordination, general X2 management and error handling, application level data exchange between femtocell base stations, and Trace function.

In accordance with another embodiment of the present invention, a femtocell base station may include a query unit and a setup unit. The query unit may be configured to obtain corresponding Internet Protocol (IP) addresses of at least one neighbor femtocell base station. The setup unit may be configured to set up an interface to the at least one neighbor femtocell base station using the obtained IP address.

The femtocell base station may further include a receiving unit and a determination unit. The receiving unit may be configured to receive a signal broadcast from neighbor base stations in a listening mode. The determination unit may be configured to detect the at least one neighbor femtocell base station among each neighbor base station based on cell information included in the broadcast signal.

The query unit may be configured to send a request for the IP address of the detected femtocell base station to a management system, and receive the IP address of the detected femtocell base station from the management system.

The determination unit may be configured to extract a physical cell identifier and/or a cell global identifiers included in the cell information and to use the extracted physical cell identifier and/or cell global identifier to determine whether each neighbor base stations is a femtocell base station.

The query unit may be configured to include at least one of a physical cell identifier and a cell global identifier of the detected at least one femtocell base station in an information request message and to transmit the information request message to the management system.

The query unit may be configured to receive an information response message from the management system. The information response message may include the IP address of the detected at least one femtocell base station.

The setup unit may be configured to transmit an X2 setup request message to the at least one neighbor femtocell base station using the obtained IP address, and receive an X2 setup response message from the at least one neighbor femtocell base station.

The management system may include a receiver and a responder. The receiver may be configured to receive an information request message having at least one of a physical cell identifier and a global cell identifier of the at least one neighbor femtocell base station. The responder may be configured to transmit an information response message having an IP address of the at least one neighbor femtocell base station in response to the information response message.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
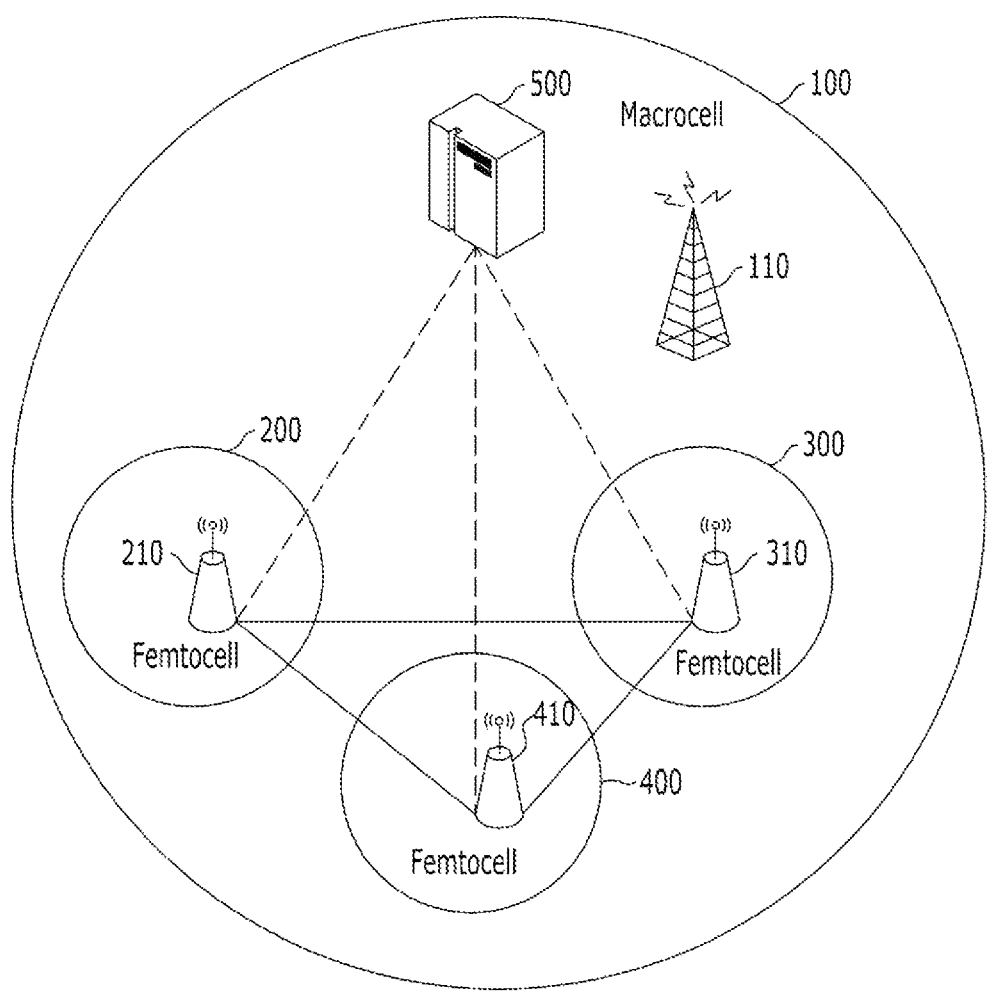
FIG. 1 shows femtocell base stations and a management system therefor in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, a femtocell base station may set up an X2 interface to a neighbor femtocell base station. In order to set up an X2 interface, a femtocell base station may detect neighbor femtocell base stations in a listening mode, request an X2 interface IP address of the detected neighbor femtocell base station to provide such to a related management system, and set up an X2 interface using the X2 interface IP address of the neighbor femtocell base station. Hereinafter, a femtocell base station and a management system therefor in accordance with an embodiment of the present invention will be described with reference to FIG. 1 to FIG. 3.

FIG. 1 illustrates femtocell base stations and a management system therefor in accordance with an embodiment of the present invention.

Referring to FIG. 1, macrocell 100 may be overlapped with a plurality of femtocells 200, 300, and 400. Macrocell base station 110 may control and manage entities located in macrocell 100. Femtocell base stations 210, 310, and 410 may respectively control and manage entities located in femtocells 200, 300, and 400. Management system 500 may control and manage femtocell base stations 210, 310, and 410. Macrocell base station 110 may be referred to as evolved Node B (eNodeB). Femtocell base stations 210, 310, and 410 may be referred to as a Home NodeB (HNB) for a 3G femtocell or as a Home Evolved Node Base station (HeNB) for an LTE femtocell. Management system 500 may be referred to as a HeNB management system.

Femtocell base stations 210, 310, and 410 may provide a communication service to user equipment located in femtocell 200, 300, and 400, respectively. For example, femtocell base stations 210, 310, and 410 may connect user equipment over wireless air interface to a service provider's network.

In accordance with an embodiment of the present invention, femtocell base stations 210, 310, and 410 may establish an X2 interface to neighbor femtocell base stations. The X2 interface may allow femtocell base stations to be interconnected with each other. The X2 interface may be a logical interface between two femtocell base stations. The X2 interface may be a point to point link between femtocell base stations. The femtocell base stations may exchange signaling information, including control data. through the X2 interface. The X2 interface may enable femtocell base stations to perform handover and load balancing by exchanging information through the X2 interface. Particularly, the X2 interface may provide functions of mobility management, load management, inter-cell interference coordination, general X2 management and error handling, application level data exchange between eNBs, and Trace function.

In order to set up an X2 interface, femtocell base station 210, 310, and 410 may broadcast a signal containing cell information. The cell information may be captured from surrounding environment. The cell information may include a physical cell identifier (PCI) or a cell global identifier (CGI)

of neighbor base station. For example, cell information may be included in a pilot signal and the pilot signal may be broadcast. Furthermore, femtocell base stations 210, 310, and 410 may receive signals broadcast from neighbor base stations in a listening mode. The broadcast signals may include cell information of neighbor base stations. Femtocell base stations 210, 310, and 410 may extract cell information from the received signals and determine whether a neighbor base station is a femtocell base station based on the extracted cell information. The cell information may contain a PCI or a CGI of a neighbor base station. The PCI may be used to determine whether a neighbor base station is a femtocell base station.

When a neighbor base station is a femtocell base station, femtocell base stations 210, 310, and 410 may request an X2 interface IP address of the neighbor femtocell base station to management system 500. In order to perform such request, femtocell base stations 210, 310, and 410 may transmit an information request message including a CGI of a neighbor femtocell base station to management system 500. In response to the information request message, femtocell base stations 210, 310, and 410 may receive an information response message from management system 500. The information response message may include a requested X2 interface IP address of a neighbor femtocell base station. Femtocell base stations 210, 310, and 410 may set up an X2 interface based on the received X2 interface IP address.

Management system 500 may manage femtocell base stations 210, 310, and 410. Management system 500 may perform configuration management (CM), fault management (FM), and performance management (PM). Furthermore, management system 500 may identify femtocell base stations and verify locations of femtocell base stations. Management system 500 may perform discover and assign a solving management system, a serving security gateway (SeGW), and mobility management entity (MME). In addition, management system may upload and download files related to femtocell base station managements. Management system 500 may be referred to as Home eNodeB management system (HeMS) or as home NodeB management system (HMS).

Such management system 500 may establish a secure Internet Protocol (IP) connectivity to femtocell base stations 210, 310, and 510 and set up a session based on a communication protocol. For example, management system 500 may employ a technical report (TR)-069 protocol for managing femtocell base stations 210, 310, and 510. The TR-069 protocol may provide communication between customer-premises equipment (CPE) and auto configuration servers (ACS) based on a simple object access protocol (SOAP) and a hypertext transfer protocol (HTTP).

Management system 500 may set up a TR-069 session to femtocell base stations 210, 310, and 410 and exchange messages defined in the TR-069 protocol with femtocell base stations 210, 310, and 410. In order to set up the TR-069 session, management system 500 may include a TR-069 manager for performing an ACS function and each femtocell base station 210, 310, and 410 may include a TR-069 agent for performing a CPE function.

In accordance with an embodiment of the present invention, management system 500 may receive an information request message from femtocell base stations 210, 310, and 410. The information request message may be sent for requesting X2 interface IP addresses of neighbor femtocell base stations 210, 310, and 410. In response to information request message, management system 500 may transmit an information response message. The information response message may include X2 interface IP addresses of neighbor femtocell base stations 210, 310, and 410. The X2 interface IP addresses of neighbor femtocell base stations 210, 310 and 410 may be stored during establishing IP connectivity to neighbor femtocell base station 210, 310, and 410 and/or during registering neighbor femtocell base stations 210, 310 and 410 at management system 500.

As described above, femtocell base stations 210, 310, and 410 may establish an X2 interface with neighbor femtocell base stations in accordance with an embodiment of the present invention. Hereinafter, femtocell base stations 210, 310, and 410 will be described with reference to FIG. 2 in detail. For convenience and ease of understanding, femtocell base station 210 will be described representatively. Femtocell base stations 310 and 410 may have a structure similar to that of femtocell base station 210 and operate in an analogous manner.

Figure 2:
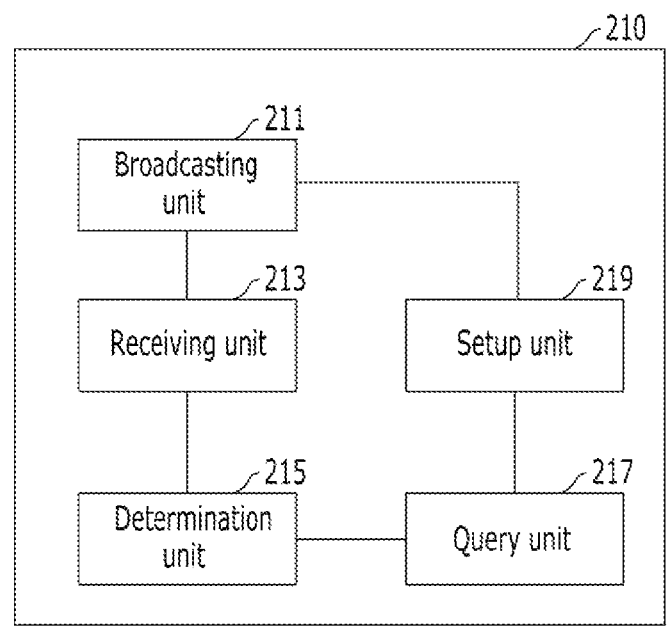
FIG. 2 shows a femtocell base station in accordance with an embodiment of the present invention.

FIG. 2 shows a femtocell base station in accordance with an embodiment of the present invention.

Referring to FIG. 2, femtocell base station 210 may include broadcasting unit 211, receiving unit 213, determination unit 215, query unit 217, and setup unit 219.

Broadcasting unit 211 may broadcast a signal containing cell information. The cell information may include information collected from surrounding environment. For example, the cell information may include PCIs and/or CGIs of neighbor femtocell base stations. Broadcasting unit 211 may include the cell information in a pilot signal and broadcast the pilot signal.

Receiving unit 213 may receive signals from neighbor base stations in a listening mode of femtocell base station 210. The signals may be pilot signals broadcast from neighbor base stations. The signals may include cell information of neighbor base stations, for example, femtocell base stations 310 and 410 and macrocell base station 110. Receiving unit 213 may scan all signals broadcasted from neighbor base stations including femtocell base stations 310 and 410 and macrocell base station 110.

Determination unit 215 may extract cell information from the received signals and determine whether a neighbor base station is a femtocell base station based on the extracted cell information. The cell information may contain a PCI or a CGI of neighbor base station. For example, determination unit 215 may analyze the PCI of a neighbor base station and determine whether the PCI of the neighbor base station indicates an identifier of a femtocell base station based on the analysis result. Particularly, PCIs in a certain range may be firstly assigned to macrocell base stations. Accordingly, determination unit 215 can determine whether a neighbor base station is a femtocell base station based on a PCI of a neighbor base station.

When determination unit 215 determines that a neighbor base station is a femtocell base station, query unit 217 may include a CGI of a neighbor femtocell base station in an information request message (e.g., such as is defined in a TR-069 protocol), and transmit the information request message to management system 500. By transmitting the information request message, query unit 217 may request an X2 interface IP address of the neighbor femtocell base station. In response to the information request message, query unit 217 may receive an information response message including an X2 interface IP address of a neighbor femtocell base station.

Setup unit 219 may perform an X2 setup request function and an X2 setup response function. For example, setup unit 219 may set up an X2 interface with neighbor femtocell base stations 310 and 410 and transmit an X2 setup request to neighbor femtocell base stations 310 and 410 using the X2 interface IP address included in the received information response message from management system 500. Furthermore, setup unit 219 may set up an X2 interface in response to an X2 setup request from neighbor femtocell base station 310 and 410.

As described above, femtocell base station management 500 may provide an X2 interface IP address of neighbor femtocell base stations in response to a request from femtocell base station. Hereinafter, femtocell base station management 500 will be described with reference to FIG. 3. For convenience and ease of understanding, only the following sections related to setting up an X2 interface will be described.

Figure 3:
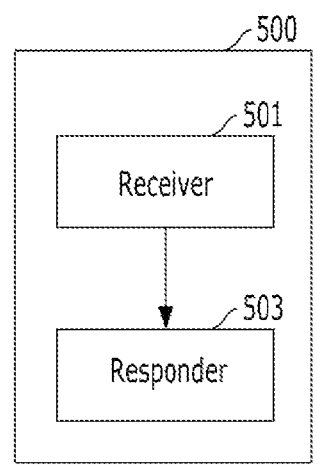
FIG. 3 shows a management system in accordance with an embodiment of the present invention.

FIG. 3 shows a management system in accordance with an embodiment of the present invention.

Referring to FIG. 3, management system 500 may include receiver 501 and responder 503. Receiver 501 may receive an information request message from femtocell base stations 210, 310, and 410. The information request message may be sent to request X2 interface IP addresses of neighbor femtocell base stations 310 and 410 for establishing an X2 interface to neighbor femtocell base stations 310 and 410.

Responder 503 may transmit an information response message to femtocell base stations 210, 310, and 410 in response to the information request message. The information response message may include X2 interface IP addresses of neighbor femtocell base stations 310 and 410 for setting tip an X2 interface to neighbor femtocell base stations 310 and 410. The X2 interface IP addresses of neighbor femtocell base stations 310 and 410 may be stored during establishing IP connectivity to neighbor femtocell base station 310 and 410 and registering neighbor femtocell base stations 310 and 410.

As described above, femtocell base stations in accordance with an embodiment of the present invention may set up an X2 interface to neighbor femtocell base stations. Such an X2 interface may enable femtocell base stations to perform various functions of the X2 interface, including handover and load balancing, in accordance with an embodiment of the present invention.

Hereinafter, a method for establishing an X2 interface between femtocell base stations will be described with reference to FIG. 4 to FIG. 6. Throughout FIG. 1 to FIG. 6, the like reference numbers denote the same elements.

Figure 4:
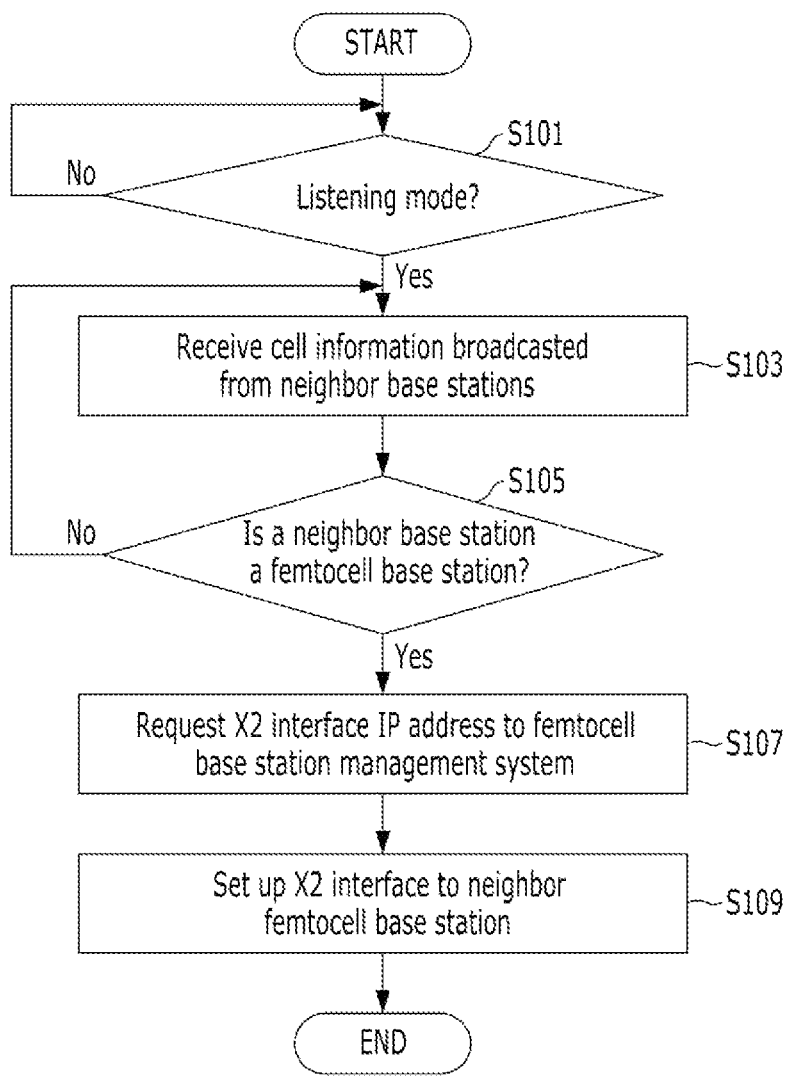
FIG. 4 shows a method for establishing an X2 interface between femtocell base stations in accordance with an embodiment of the present invention.

FIG. 4 shows a method for establishing an X2 interface between femtocell base stations in accordance with an embodiment of the present invention.

Referring to FIG. 4, determination may be made as to whether a current mode is a listening mode at step S101. For example, receiver 213 of femtocell base station 210 may determine whether a current mode is a listening mode or not.

When step S101 determines that the current mode is the listening mode (Yes—S101), signals broadcast from neighbor base stations may be scanned and signals having cell information may be received during the listening mode at step S103. For example, receiver 213 of femtocell base station 210 may receive pilot signals broadcast from neighbor base stations 310 and 410 and extract cell information included in the pilot signals. When step S101 determines that the current mode is not listening mode (No—S101), the method returns to the start.

Determination may be made as to whether a neighbor base station is a femtocell base station at step S105. Such determination may be made based on the cell information included in the received signal. Particularly, cell information may include a PCI and/or a GCI of a base station that broadcasts a signal having the cell information. Based on the PCI of a base station, step S105 may determine whether a base station is a femtocell base station. When a neighbor base station is not a femtocell base station (No—S105), the method returns to step S103.

When a neighbor base station is a femtocell base station (Yes—S105), an X2 interface IP address request of the neighbor femtocell base station may be applied to management system 500 and the requested X2 interface IP address may be received from femtocell base station management at step S107. For example, query unit 217 of femtocell base stations 210 may make a request for an X2 interface IP addresses of neighbor femtocell base stations 310 and 410 to management system 500 and receive the requested X2 interface IP addresses from management system 500 at step S107. In order to request the X2 interface IP address, an information request message including a CGI of a neighbor femtocell base station may be transmitted to management system 500. In response to the information request message, an information response message may be received from management system 500. The information response message may include the requested X2 interface IP address of neighbor femtocell base station 310 or 410.

An X2 interface may be established between femtocell base stations 210 and neighbor femtocell base stations 310 and 410 using the received X2 interface IP addresses at step S109. For example, setup unit 219 may set up X2 interfaces to neighbor femtocell base stations 310 and 410 using the received X2 interface IP addresses. The X2 interface IP address may be included in the information response message transmitted from management system 500. Furthermore, neighbor femtocell base stations 310 and 410 may set up an X2 interface to femtocell base station 210 in response to the X2 setup request message from femtocell base station 210.

Figure 5:
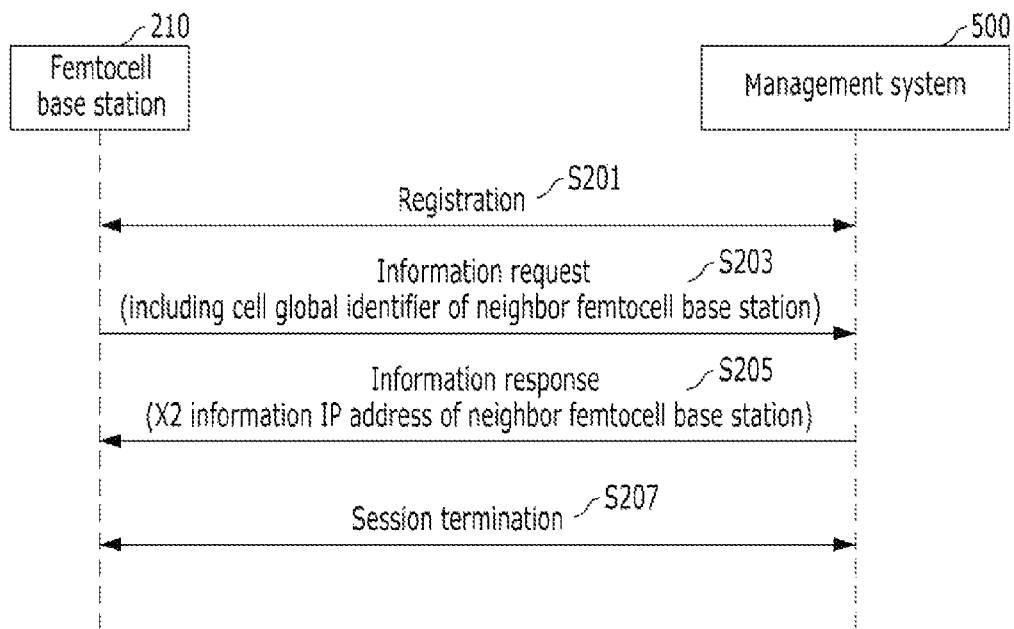
FIG. 5 shows messages exchanged between a femtocell base station and a management system for setting up an X2 interface in accordance with an embodiment of the present invention.

FIG. 5 shows messages exchanged between a femtocell base station and a management system for setting up an X2 interface in accordance with an embodiment of the present invention.

Referring to FIG. 5, registration of femtocell base stations may be made at a management system at step S201. For example, femtocell base stations 210, 310, and 410 may be registered at management system 500. During the registration, management system 500 may store PCIs and/or CGIs of femtocell base stations 210, 310, and 410. After registration, a session may be established between femtocell base station 210 and management system 500. The session may be a TR-069 session.

After forming the session, an information request message may be transmitted at step S203. For example, query unit 217 of femtocell base station 210 may include CGIs of neighbor femtocell base stations 310 and 410 in the information request message and transmit the information request message to the management system 500 after detecting neighbor femtocell base stations 310 and 410.

In response to the information request message, an information response message may be transmitted at step S205. For example, management system 500 may generate an information response message including X2 interface IP addresses corresponding to the CGIs of neighbor femtocell base stations 310 and 410 and transmit the generated the information response message to femtocell base station 210. After the transmission, session between femtocell base station 210 and management system 500 may be terminated at step S207. For example, the TR-069 session may be terminated.

Figure 6:
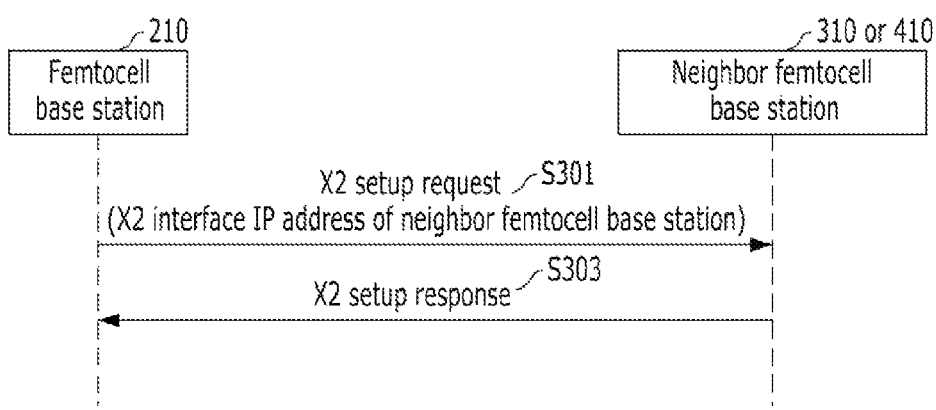
FIG. 6 shows messages exchanged between a femtocell base station and a neighbor femtocell base station for setting up an X2 interface in accordance with an embodiment of the present invention.

FIG. 6 shows messages exchanged between a femtocell base station and a neighbor femtocell base station for setting up an X2 interface in accordance with an embodiment of the present invention.

Referring to FIG. 6, an X2 setup request may be transmitted from a femtocell base station to a neighbor femtocell base station at step S301. For example, setup unit 219 of femtocell base station 210 may transmit an X2 setup request message to neighbor femtocell base stations 310 and 410 using the X2 interface IP addresses of neighbor femtocell base stations 310 and 410.

In response to the X2 setup request message, an X2 setup response message may be transmitted at step S303. For example, femtocell base stations 310 and 410 may transmit the X2 setup response message to femtocell base station 210 at step S303.

By exchanging the X2 setup request message and the X2 setup response message, X2 interfaces may be established between femtocell base station 210 and neighbor femtocell base stations 310 and 410.

As described above, an X2 interface between femtocell base stations may be established in accordance with an embodiment of the present invention. The X2 interface may enable femtocell base stations to perform various functions of X2 interface, including handover and load balancing. Accordingly, femtocell base stations and corresponding user equipments can be efficiently managed and controlled in accordance with an embodiment of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a compute-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for establishing an X2 interface between a femtocell base station and a neighbor femtocell base station, the method comprising:

obtaining, by the femtocell base station, an Internet Protocol (IP) address of one or more neighbor femtocell base stations; and establishing the X2 interface between the femtocell base station and the neighbor femtocell base station using the corresponding, obtained IP address, wherein the obtaining IP address includes:
   detecting the one or more neighbor base stations;
   selecting the neighbor femtocell base station from the one or more neighbor base stations;
   requesting the IP address of the selected neighbor femtocell base station to a management system; and
   receiving the IP address of the selected neighbor femtocell base station from the management system.

2. The method of claim 1, wherein the detecting the neighbor femtocell base station includes:
   receiving signals broadcast from the one or more neighbor base stations;
   extracting cell information from the received signals;
   identifying the one or more neighbor femtocell base stations from the one or more neighbor base stations based on the extracted cell information.

3. The method of claim 2, wherein, for the extracting, the cell information includes physical cell identifiers and/or cell global identifiers of the neighbor base stations, the physical cell identifier and/or cell global identifiers associated with the identifying each of the one or more neighbor femtocell base stations from each of the one or more neighbor base stations.

4. The method of claim 2, wherein the broadcast signals are pilot signals.

5. The method of claim 2, comprising scanning and receiving the broadcast signals in a listening mode of the femtocell base station.

6. The method of claim 1, wherein, for the requesting the IP address:
   including a physical cell identifier and/or a cell global identifier corresponding to the neighbor femtocell base station in an information request message; and
   transmitting the information request message to the management system.

7. The method of claim 6, wherein in the receiving the IP address, receiving an information response message from the management system having the IP address of the corresponding femtocell base station.

8. The method of claim 6, wherein, prior to transmission of the information request message, registering of the neighbor femtocell base station at the management system, establishing a session between the femtocell base station to the management system, and transferring the information request message and the information response message through the session.

9. The method of claim 6, wherein after exchanging the information request message and the information response message, terminating the session.

10. The method of claim 1, wherein the establishing the X2 interface includes:
   transmitting an X2 setup request message to the neighbor femtocell base station using the corresponding IP address; and
   receiving an X2 setup response message from the neighbor femtocell base station.

11. The method of claim 1, wherein, for the establishing the X2 interface, enabling, by the X2 interface, the femtocell base station and the neighbor femtocell base station functions of mobility management, load management, inter-cell interference coordination, general X2 management and error handling, application level data exchange between femtocell base stations, and Trace function.

12. A femtocell base station comprising:
   a query unit configured to obtain corresponding Internet Protocol (IP) addresses of at least one neighbor femtocell base station; and
   a setup unit configured to set up an interface to the at least one neighbor femtocell base station using the obtained IP address;
   a receiving unit configured to receive a signal broadcast from neighbor base stations in a listening mode; and
   a determination unit configured to detect the at least one neighbor femtocell base station among each neighbor base station based on cell information included in the broadcast signal,
   wherein the query unit is configured to send a request for the IP address of the detected femtocell base station to a management system, and to receive the IP address of the detected femtocell base station from the management system, and
   wherein the management system includes a receiver configured to receive an information request message having at least one of a physical cell identifier and a global cell identifier of the at least one neighbor femtocell base station and a responder configured to transmit an information response message having an IP address of the at least one neighbor femtocell base station in response to the information response message.

13. The femtocell base station of claim 12, wherein the determination unit is configured to extract a physical cell identifier and/or a cell global identifiers included in the cell information and to use the extracted physical cell identifier and/or cell global identifier to determine whether each neighbor base stations is a femtocell base station.

14. The femtocell base station of claim 12, wherein the query unit is configured to include at least one of a physical cell identifier and a cell global identifier of the detected at least one femtocell base station in an information request message and to transmit the information request message to the management system.

15. The femtocell base station of claim 14, wherein:
   the query unit is configured to receive an information response message from the management system; and
   the information response message includes the IP address of the detected at least one femtocell base station.

16. The femtocell base station of claim 12, wherein the setup unit is configured to:
   transmit an X2 setup request message to the at least one neighbor femtocell base station using the obtained IP address; and
   receive an X2 setup response message from the at least one neighbor femtocell base station.

17. A femtocell base station comprising:
   a determination unit configured to detect neighbor femtocell base stations and select one of the detected neighbor base stations;
   a query unit configured to obtain corresponding Internet Protocol (IP) addresses of the selected neighbor femtocell base station from a management system by sending a request for the IP address of the selected neighbor femtocell base station to the management system and receiving the IP address of the selected neighbor femtocell base station from the management system; and
   a setup unit configured to set up an X2 interface to the selected neighbor femtocell base station using the obtained IP address from the management system.

18. The femtocell base station of claim 17, further comprising:
   a receiving unit configured to receive a signal broadcast from neighbor base stations in a listening mode,
   wherein the determination unit is configured to detect the neighbor femtocell base stations based on cell information included in the broadcast signal.

19. The femtocell base station of claim 18, wherein the management system includes:
- a receiver configured to receive an information request message having at least one of a physical cell identifier and a global cell identifier of the selected neighbor femtocell base station; and
- a responder configured to transmit an information response message having an IP address of the selected neighbor femtocell base station in response to the information response message.

* * * * *